United States Patent
Paganini et al.

(10) Patent No.: US 6,481,630 B1
(45) Date of Patent: Nov. 19, 2002

(54) ELECTRONIC CARD FOR COMMERCIAL OPERATIONS AND ENCODING CONSOLE TO BE USED FOR THE INITIAL LOADING OF THE CODE ASSIGNED TO THE USER OF THE SAID CARD

(76) Inventors: Rubén Nicolás Paganini, Florida 165, Local 4, 1333 Buenos Aires (AR); María Cristina Monti de Paganini, Florida 165, Local 4, 1333 Buenos Aires (AR)

(*) Notice: Subject to any disclaimer, the term of this patent is extended or adjusted under 35 U.S.C. 154(b) by 0 days.

(21) Appl. No.: 09/534,866

(22) Filed: Mar. 24, 2000

(30) Foreign Application Priority Data

Mar. 24, 1999 (AR) .................................. P 99 01 01291

(51) Int. Cl.[7] .............................................. G06K 19/00
(52) U.S. Cl. ........................ 235/487; 235/449; 235/492
(58) Field of Search ................................ 235/487, 492, 235/493, 375, 380, 382, 449

(56) References Cited

U.S. PATENT DOCUMENTS

| | | | | |
|---|---|---|---|---|
| 4,798,945 A | * | 1/1989 | Bruckner et al. | 235/479 |
| 4,931,623 A | * | 6/1990 | Nakamura et al. | 235/488 |
| 4,959,788 A | * | 9/1990 | Nagata et al. | 235/379 |
| 5,313,050 A | * | 5/1994 | Hiroki et al. | 235/379 |
| 6,055,509 A | * | 4/2000 | Powell | 705/14 |
| 6,089,451 A | * | 7/2000 | Krause | 235/380 |
| 6,216,955 B1 | * | 4/2001 | Le Roux et al. | 235/492 |
| 6,264,108 B1 | * | 6/2001 | Baentsch | 235/487 |

* cited by examiner

*Primary Examiner*—Michael G. Lee
*Assistant Examiner*—Daniel St. Cyr
(74) *Attorney, Agent, or Firm*—Merchant & Gould P.C.

(57) ABSTRACT

Electronic card for commercial operations and coding console to be used for the initial loading of the code assigned to the user of the card, this card being of the type used as purchasing and/or credit card, the said card comprising an electronic circuit based on a microprocessor, which permits verification that the carrier of the card is the authorized user for the utilization of same. For this purpose, this card has contacts for the initial loading of the identification code of the user, using an encoding console and a keyboard arranged on the card for the entry of the said code at the time of making the desired commercial operation. The card includes a light-up indicator and a piezoelectric buzzer, which indicate that the code entered through the keyboard into the card coincides with the code previously recorded using the encoding console in a memory of the card, thus verifying the authorization of use by the carrier of same. The encoding console includes magnetic tape reading heads and recording/reading of messages of the status and user code in the card, an alphanumeric keyboard for entering the code and a display which exhibits messages regarding the status of the card and assigned code, and a printing head of the said code.

8 Claims, 2 Drawing Sheets

US 6,481,630 B1

ELECTRONIC CARD FOR COMMERCIAL OPERATIONS AND ENCODING CONSOLE TO BE USED FOR THE INITIAL LOADING OF THE CODE ASSIGNED TO THE USER OF THE SAID CARD

BACKGROUND OF THE INVENTION

1. Field of the Invention

The present invention refers to an electronic card for commercial operations and to an encoding console to be used for the initial loading of the code assigned to the user of the said card, and, more particularly, it refers to a card of the type that includes means of storage of data and identification codes of the owner of the said card, previously recorded with the aid of the said encoding console, which permits verification that the carrier of the said card is actually its owner or a person authorized to use it in commercial operations. That is to say, that the user of the card can demonstrate, with the aid of the same card and upon request of the personnel in charge of receiving payment for the sale of a product or provision of a service, that he/she is entitled to use the said card.

2. Description of the Prior Art

Until now, the purchasing cards or credit cards used for most varied commercial operations had a magnetic tape incorporated where the data and the user code are recorded, among other possible information. At the time of acquiring a product or paying for a specific service, all the purchaser had to do is present the card, sign a receipt where the data of the client and of the card are transcribed and usually to present an identification document of the purchaser. This, in general, is considered sufficient for accepting the legitimate ownership of the carrier of the card as valid.

Unfortunately, it happens more and more frequently that persons who are not duly authorized, use the card or cards of the legitimate owner to carry out commercial operations for their own and exclusive benefit. In the case of robbery, theft or misplacement of documentation, including identification documents and purchasing and/or credit cards, if the corresponding denunciation has not been made immediately, this situation becomes more risky for the owner of the card, since the amounts to be debited in a corresponding bank account, could reach large figures that could cause serious economic damage.

SUMMARY OF THE INVENTION

With the purpose of providing an effective solution to these problems, the card which is the object of the present invention permits verification of the legitimacy of the owner or person authorized to use the said cards in commercial operations of purchasing and/or credit, which is done with the aid of visual and/or auditory information from the same card and obviously to the person in charge of checking and accepting the corresponding payment to be made in this way.

That is to say, that the invention which will be described below, can be carried to practice in the form of cards of the type mentioned above, which include, for example, a magnetic data storage tape for the operation of automatic tellers.

As it will be explained below, the verification of the nature of "authorized user" is carried out by entering a personal code manually into the card, after which, if the entered code is correct, a signal indicating authorization becomes activated.

Therefore, it is an object of the present invention to provide an electronic card for commercial operations, where the said card is the type used as purchasing card and/or credit card and includes means of storage of data and codes of the user of the said card, such as magnetic tapes, in which the said data storage means and codes comprise an electronic circuit connected to means of input of initial recording, by means of an encoding console, of the user code in a memory of the said electronic circuit, the said card having means of direct manual entry of the verification code of the user authorized to use the card (operable at any time when such verification is required), the said card also including means of information about the correct entry of the code.

It is also an object of the present invention to provide an encoding console to be used for the initial loading of the code assigned to the user of the card in accordance with any of the previous claims, which comprises a magnetic tape reading head and a reading/recording head of the card, connected to a microprocessor programmed according to an operating sequence of verification and recording of data, codes and messages about the status of the said card, this said microprocessor being, in turn, connected to an alphanumeric display exhibiting the messages of the status of the card, to an alphanumeric keyboard of the initial loading of the user code and to a printing head of the assigned code.

BRIEF DESCRIPTION OF THE DRAWINGS

For better clarity and comprehension of the object of the present invention, it is illustrated in various figures in which it is represented in one of the preferred forms of embodiment, all as examples, where.

DESCRIPTION OF THE PREFERRED EMBODIMENTS

Figure 1:
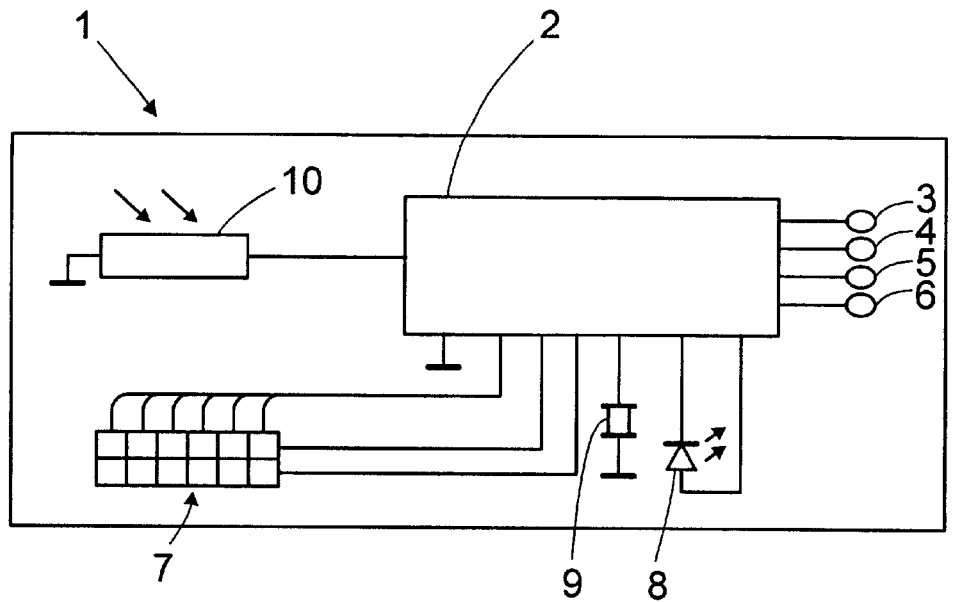
FIG. 1 shows a general scheme of the principal parts which permit the operation of the card, which is the object of the present invention.

First of all, making reference to FIG. 1, where general reference 1 indicates the representation of the card, which is the object of the present invention, and means of storage of data under user code in this card 1 are shown, which include an electronic circuit 2, which, in practice, is an integrated circuit, connected to means of input for the initial loading of the user code, which comprise a set of contacts 3 to 6, accessible from the outside of card 1 of the pressure type, and constructed of an inalterable metal.

Card 1 has means of input of the user code for the verification of the owner during the use of the card, also accessible from the outside of the said card 1, which comprise a membrane keyboard 7, with twelve keys, preferably alphanumeric ones. In a preferred embodiment of the present invention, the code to be loaded consists of 6 characters, suggesting to use, for example, three numeric and three alphabetic characters, which, nevertheless, will depend on the combination of characters selected for tie initial loading of the code.

Information of correct input of the code is confirmed by means of a visual indicator or display, formed in this example of embodiment by a light-emitting diode 8, at the same time, this information is complemented by a piezoelectric buzzer 9, which emits an audible sound of two seconds of duration, thus indicating that verification was realized.

Both the lighting up of diode 8, as well as the activation of the buzzer 8 [should be 9] occurs only when the code entered via the keyboard 7 coincides with the code stored in the memory included for this purpose in circuit 2. In addition, it should be pointed out that, upon pressing any of the keys of keyboard 7, the buzzer 9 is activated, giving a short-duration audible sound to indicate that the corresponding key was pressed correctly.

Electrical energy to feed the components of this card is supplied by a panel of photoelectric cells 10, which is sufficient given the low consumption of the circuits involved.

Figure 2:
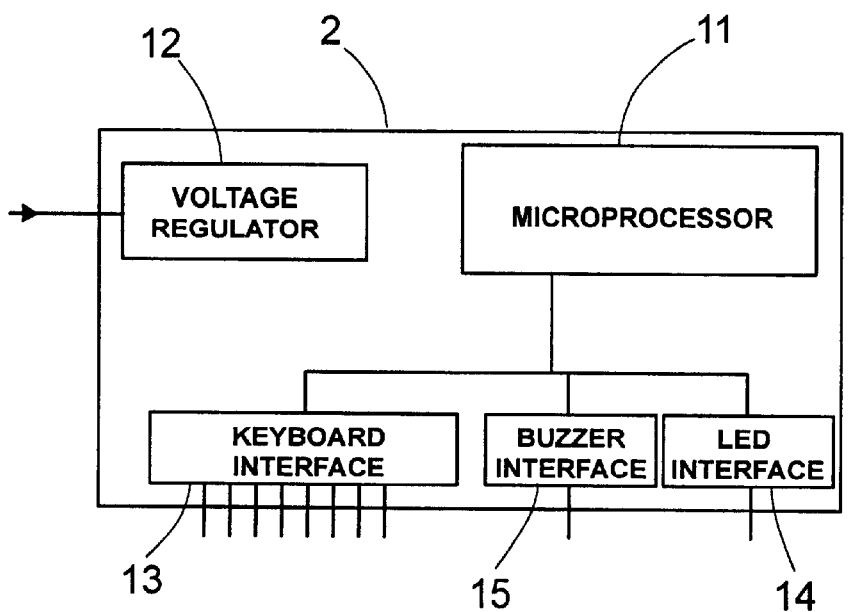
FIG. 2 is a block diagram of an electronic circuit included in FIG. 1.

It can be seen in FIG. 2 that the electronic circuit 2 includes a microprocessor 11. The stability of voltage supplied by the photoelectric panel 10, is achieved by means of a voltage regulator 12. It is also shown that the microprocessor 11 is connected to the keyboard 7, to light-emiting diode 8 and to buzzer 9 by means of a keyboard interface 13, a display interface 14 and a buzzer interface 15, respectively.

In the preferred embodiment which was described, the integrated circuit 2 is preferably the "custom" type, based on silicon, with the ability of processing and storing data and having data input and output ports for the purpose of reading keyboard 7, lighting up of diode 8, excitation of buzzer 9 and loading of the code assigned to each user in an EEPROM memory. The microprocessor 11 is especially programmed for the function that the card, which is the object of the present invention, must perform.

Once the voltage produced by the photoelectric cells 10 reaches the operative value required for normal operation of the circuits included on card 1, a value which is detected by the voltage controller 12, the microprocessor 11 begins an initialization routine during which it loads adequately its data, its programs and the input and output ports [sic], remaining in "standby", that is, in a state of waiting, making periodic readings of keyboard 7. Upon pressing any of the keys of keyboard 7, the corresponding value is stored in the RAM memory of microprocessor 11 as "key 1" variable, loading a logic value 1 in a determined address of the said RAM memory, which operates as a "key counter", carries the interface 14 of buzzer 9 to the activated state and enters into a waiting routine of 0.5 seconds, at the end of which it reads again the value of the key that was pressed and deactivates the excitation signal of buzzer 9. If the value of the key pressed is the same as that read previously, the microprocessor 11 waits for the release of the letter. Then the above cycle is repeated, loading "key 2" to "key 6", thus incrementing the key counter until it reaches a value equal to 6. At the end of each cycle of reading the keys, through the arithmetic and logic unit of the microprocessor 11, the value reached by the key counter is compared to the value recorded as maximum value 6. When the comparison gives equality between the quantity of keys pressed and the maximum prefixd value of 6 as a result, the reading routine of the keyboard is concluded and the system enters into the code recognition subprogram.

In this code recognition subprogram, the microprocessor 11 fetches sequentially from its EEPROM memory the code of 6 characters stored in it and transfers it to the 6 addresses of the RAM memory and identifies them as "code 1" to "code 6". Starting from here, using the same address of the RAM memory that was used as key counter, the microprocessor 11 begins a cycle of comparisons ranging from "key 1" and "code 1" to "key 6" and "code 6". If, as a result of the sequential comparisons performed, the entered code is found to be equal to the stored code, the microprocessor 11 brings the excitation signals of diode 8 and buzzer 9 to the active level and begins the waiting routine until 5 seconds elapse, then deactivates the excitation of diode 8 and buzzer 9 and the program returns to its initial state.

If the code entered was not equal to that stored in the EEPROM memory of microprocessor 11, it activates the buzzer 9 intermittently for 5 seconds, according to a sequence of 0.5 second of activation and 1 second of silence.

Figure 4:
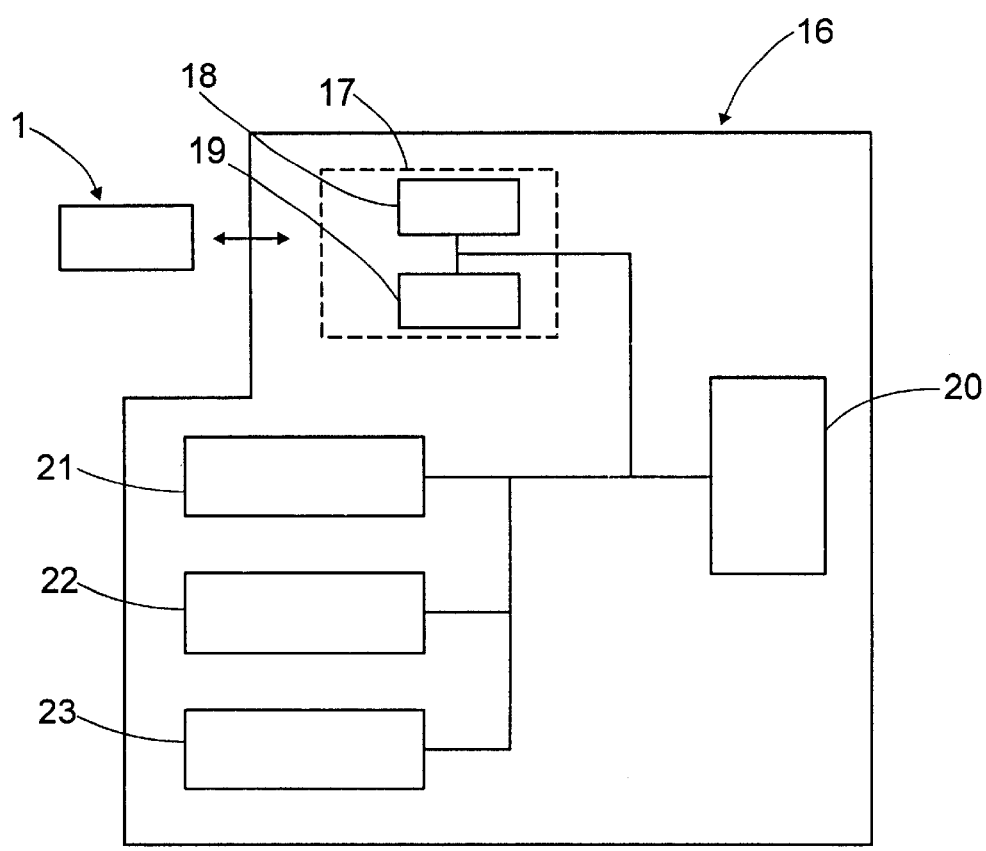
FIG. 4 is a block diagram of a console used for the initial loading of the card with the code assigned to or selected by its owner.

For the initial loading of the user code into the card, an external device is used, such as that represented in FIG. 4, indicated with general reference 16, which defines an encoding console, the structure and operation of which could be compared to the devices used as automatic tellers. In this way, upon introducing the card 1 into a section 17 of the reader/recorder of the said encoding console 16, it provides, through contacts 3 and 6, the feed voltage for circuit 2, while using contacts 5 and 6, via request for interruption, it loads the selected user code. This code is recorded permanently in the memory of card 1. In the said section 17, a magnetic tape reading head 18 detects the presence of card 1 and, with the aid of a signal generated by its own electronic circuit, gives the order of activation to a microprocessor 20, which, in turn, gives the order to the said head 18 to read and compare the data read by the latter with the data stored in the memory of microprocessor 20. If the compared data are correct, that is, if the card entered is one for use with the aid of console 16, the microprocessor 20 orders the reading/recording head 19 of card 1 to read its status in the memory of same. If this status corresponds to an unauthorized card, the microprocessor 20 sends to a display or screen 21 a message warning about this unauthorization and orders the magnetic tape reading head 18 to expel card 1. If the status corresponds to a "virgin" card, the microprocessor 20 reads through reading/recording head 19 the configuration of keyboard 7 and sends to the display 21 the information on the alphanumeric characters that the card 1 has and that the user can combine at his/her own judgment.

For the latter, the microprocessor 20 starts a keyboard 22 reading routine, preferably an alphanumeric keyboard, in which it only recognizes the approved characters. When the 6 characters that form the code of the legitimate user are introduced, the microprocessor 20 records in the memory of card 1, using the reading/recording head 19, the code entered by the user. During this operation, the microprocessor 20 sends to display 21 the information corresponding to the quantity of digits selected at that time. Similarly, it records on the card 1 the new status corresponding to "card with code". The microprocessor 20 then sends to a printing head 23 the order to print the recorded code. When this operation is carried out, the microprocessor 20 orders the magnetic tape reading head 18 to expel card 1.

If, on the contrary, the status corresponds to a "card with code", the microprocessor 20 reads, using the reading/recording head 19, both the actual code recorded in the memory of card 1, as well as the configuration of its keyboard 7. Then it sends to display 21 the order to show the legend "enter actual code" and proceeds to read keyboard 22. This operation includes routines of key bounce elimination and time-out. The latter permit one to allocate the time available for entering of the code by the user, so that, if there is a lapse of, for example, 4 seconds between the entering of a character and the next one, the operation is the canceled. The code entered by the user is stored temporarily in the RAM memory of microprocessor 20 and is compared with that read previously from the memory of card 1. If the two results are equal, the microprocessor 20 reinitiates the routine reading of keyboard 22, records in the memory of card 1 the code entered by the user, sends to display 21 the information on the quantity of digits selected up to this time, records on the card the new status corresponding to "card with code", sends to de printing head 23 the order to print the recorded code and orders the magnetic tape reading head 18 to expel card 1, this being now in a condition to be used by its authorized owner.

If the two codes are found to be different, the microprocessor 20 writes in display 21 "code incorrect" and asks the following: "enter other or cancel the operation?". Using an internal register of microprocessor 20, the quantity of attempts is counted. If the response of the user is YES, the previous steps are repeated twice more. If entering an incorrect code continues, the microprocessor 20 writes in display 21 "card unauthorized", and with the aid of reading/recording head 19, records in the memory of card 1 the corresponding status "card unauthorized" and expels it from console 16. If any of die code entries is found to be correct, the process returns to routine reading of keyboard 22, as mentioned before. If the response is NO, the microprocessor 20 concludes the operation and orders the expulsion of card 1.

Figure 3:
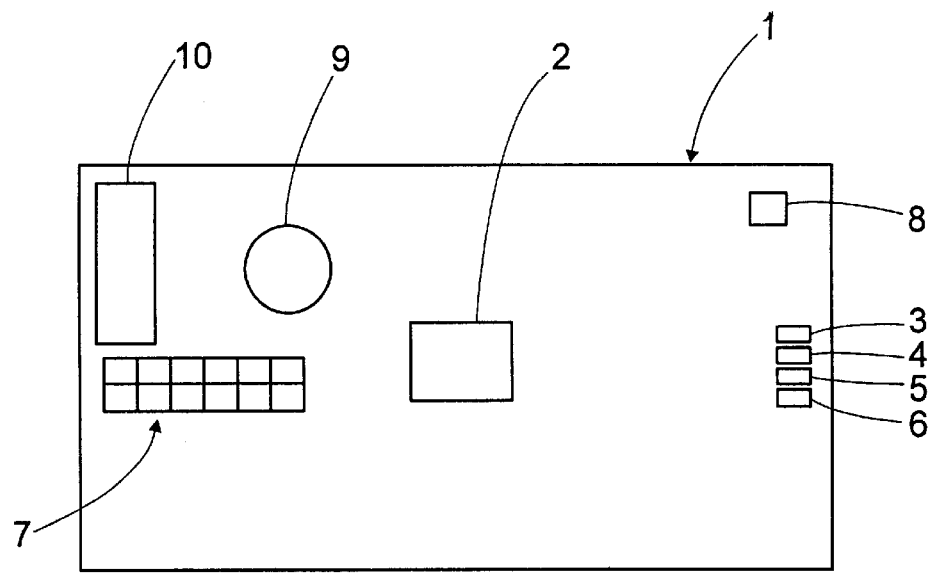
FIG. 3 represents the distribution of the components illustrated in FIG. 1 on the card.

FIG. 3 shows the arrangement of the components of this card according to a preferred embodiment, where one can see both those to which there is access or can be seen from the outside of card 1, that is, keyboard 7, light-emitting diode 8, photoelectric panel 9 and contacts 3 to 6, while circuit 2 is hidden. On its part, buzzer 9 may be visible so that, in practice, it is desirable or convenient to have it covered, which depends mainly on merely aesthetic and/or commercial considerations.

Having thus specifically described and determined the nature of the present invention, and to manner in which it is to be put into practice, it is declared that the following are claimed as property and exclusive right:

1. An electronic card for commercial operation comprising:

magnetic storage means for storing data and codes, said magnetic storage means includes an electronic circuit;

entry means connected to said electronic circuit for recording a user code into the electronic circuit;

an encoding console for encoding said user code to be recorded into the electronic circuit;

manual input means for inputting the user code;

verification means for verifying the user code; and contacts means for connecting to said encoding console, said contacts means having two electrical contacts feeding to the electronic circuit and two other contacts for initial loading of the user code.

2. The electronic card according to claim 1, wherein the electronic circuit includes a microprocessor.

3. The electronic card according to claim 2, wherein the manual input means includes a 12 keys keyboard connected to the microprocessor.

4. The electronic card according to claim 2, wherein the verification means includes a light-emitting diode for notifying when a correct code has been entered.

5. The electronic card according to claim 2, wherein the verification means includes a buzzer.

6. The electronic card according to claim 2, wherein said microprocessor includes an EEPROM memory for storing the user code.

7. The electronic card according to claim 1, wherein said electronic circuit is connected to a photoelectric cell fed through a voltage control circuit.

8. The electronic card according to claim 1, wherein a microprocessor is connected to an alphanumeric display for exhibiting messages confirming the card status.

\* \* \* \* \*